Feb. 13, 1968  C. D. HARDYCK  3,368,551
METHOD FOR CORRECTING SUBVOCALIZATION
Filed Oct. 11, 1965
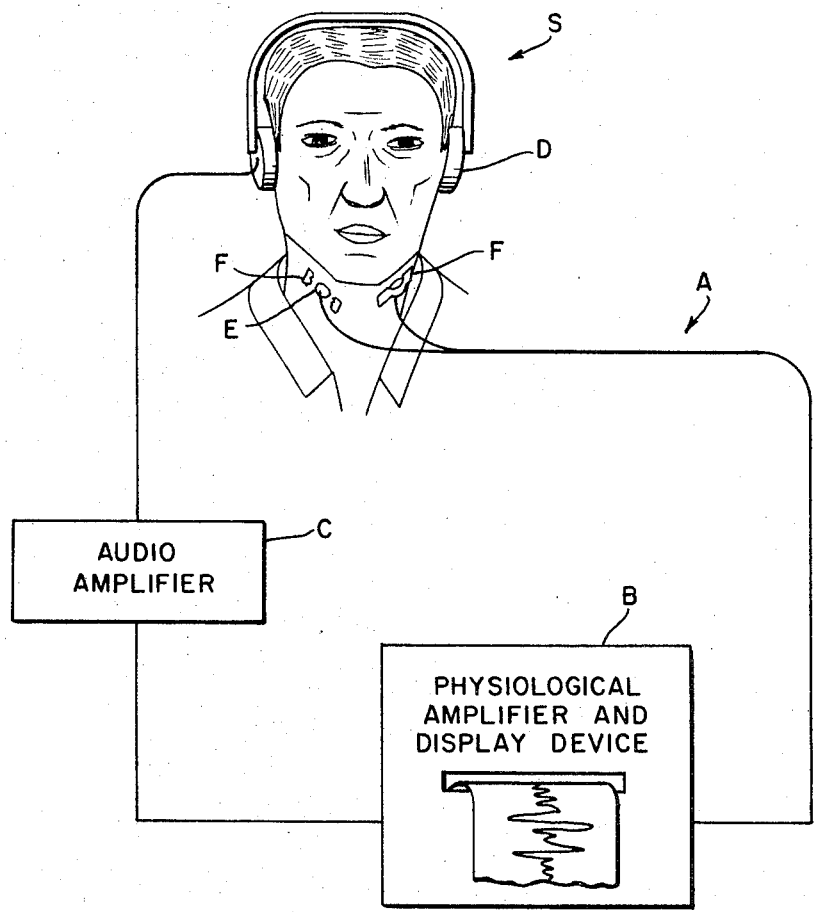
INVENTOR.
CURTIS D. HARDYCK
BY
TOWNSEND AND TOWNSEND
ATTORNEY

United States Patent Office

3,368,551
Patented Feb. 13, 1968

3,368,551
METHOD FOR CORRECTING SUBVOCALIZATION
Curtis D. Hardyck, Berkeley, Calif. (211 Medical Science Bldg., Medical Center, San Francisco, Calif. 94122)
Filed Oct. 11, 1965, Ser. No. 494,558
3 Claims. (Cl. 128—2)

The present invention is directed to a method of correcting reading difficulties and more particularly to the method for detecting and correcting subvocalization.

Subvocalization, or whispering to oneself while reading, establishes for silent reading the same maximum reading speed obtainable while reading aloud. The term "subvocalization" is used herein and in the appended claims to include a wide range of activity from inaudible articulation and vocalizations to audible whispering. An individual who subvocalizes to any great extent is limited to a top reading speed dependent upon how fast he can speak, typically on the order of 150 words per minute. If the subvocalization actions are visible, as in movements of the lips and jaw, certain corrective measures are possible to train the individual to recognize these movements and avoid them. However, if the activity is limited to vocal musculature or principally the movement of the vocal cords or vocal folds without appreciable lip and jaw movement, the problem of eliminating this activity becomes much more complex, especially since the individuals practicing such subvocalization are often not aware of these behavioral patterns and have difficulty focusing their attention on them.

The object of the present invention is to provide a method for alerting an individual when he is subvocalizing whereby he can train himself not to subvocalize.

Broadly stated, the present invention, to be described in greater detail below, is directed to the method of first detecting vocal muscle action electrical potentials of an individual, producing a signal that varies in accordance with the amount of vocal muscle action electrical potentials generated by the subject, and playing the produced signal to demonstrate the amount of vocal musculature during a given reading period. In one embodiment of this invention the step of playing the produced signal includes the production of a sound that varies in accordance with the vocal muscle action electrical potentials and feeding this sound to the individual typically by way of earphones whereby the individual is made aware of the amount of subvocalization taking place during reading.

With the method in accordance with the present invention, it is first of all possible to determine the extent of subvocalization in a given individual during reading and make the individual aware of this behavior. Further, by experimenting with different movements and actions with the realization of their effect, the individual is able to learn to control the sound played back to him characteristic of subvocalization and thereby control the amount of subvocalization that occurs during reading.

In accordance with another aspect of the present invention, the signal produced by a patient's subvocalization is fed to an instructor for observation while observing the patient's movements to aid in diagnosing the difficulties of the particular individual.

Other objects, features and advantages of the present invention will become more apparent on perusal of the following specification with reference to the drawing.

The drawing is a schematic view partially in block diagram form illustrating the present invention.

Referring now to the drawing, there is shown the utilization of the present invention for correcting subvocalization of a subject, patient or student indicated as S while he is attempting to read silently. While he is reading, vocal muscle action electrical potentials or movement of his vocal muscles is detected by a detector A and fed to a display device B. From the detector A or display device B an audio signal is fed via an audio amplifier C to the subject S typically by means of earphones D. By controlling his movements while reading to minimize the effect of the audio signal fed to him via the earphones D, the subject S is able to correct subvocalization.

While the detector A can take the form of any one of a number of different types of detectors for recognizing vocal muscle activity, surface electromyography, using electrodes placed on the subject's throat opposite the vocal muscles, operates successfully. Using surface electromyography one procedure for recording the electromyogram is as follows: first the skin of the throat opposite the vocal muscles is rubbed very lightly with extremely fine grained sandpaper. Next, the sandpapered area is scrubbed with an anti-bacterial skin cleanser and dried with a towel.

Bipolar electrodes E such as, for example, pure silver, one centimeter in diameter, are taped to the skin surface by tape F. One type of electrode used is in the shape of a half sphere with a flat rim surrounding the half sphere so that the half spherical hollow can contain electrode paste. Vocal muscle action electrical potentials are detected by the electrodes E. This signal is fed to the display device B such as, for example, a type R Offner ink-writing oscillograph for recording the electromyogram. For feeding back the signal produced in variable accordance with vocal muscle action electrical potentials, the output of the display device, such as the output from the Offner oscillograph amplifier, is connected to the audio amplifier C and thence to the earphones D.

The typical example of the manner of detecting and correcting subvocalization is as follows. The skin resistance across the bipolar electrodes of the electromyogram detector is maintained at or below 5,000 ohms. This arrangement with the specific apparatus outlined above provides a sensitivity which permits detection of the electrical activity of the vocal muscles while the subject is reading silently. By way of example, with this apparatus the signal produced during subvocalization is on the order of 40–50 microvolts as contrasted with a minimal signal of approximately 3 microvolts when the subject is completely relaxed and an extremely strong signal of approximately 1 millivolt when the subject speaks at a normal conversational level.

For initial detection of subvocalization the subject is allowed to read undisturbed without the signal applied to the earphones D for a period such as, for example, on the order of 30 minutes during which time the oscillograph record is monitored and swallows and head movements noted by an observer. Subvocalization can be checked by instructing the subject to make certain variations in his behavior such as, for example, instructing the subject to stop reading while maintaining the same position or requesting the subject to read intermittently.

If the subject subvocalizes, the feedback technique is utilized to correct subvocalization. Thus, the subject is instructed that he will be able to hear the activity of his vocal muscles as he reads. The feedback is preferably introduced while the subject is quite relaxed so that a sudden burst of sound will not startle him. He is then asked to swallow, which action immediately produces a burst of static in the earphones. Next, the subject is requested to experiment with the sound to satisfy himself that he can control it, stop it and start it by such actions as talking, swallowing, turning his head, clinching his jaw muscles and so forth. When he states that he feels comfortable about being able to control the presence or absence of the generated sound, he is directed to begin silent reading under the feedback conditions. The subject then continues to read while attempting to keep the electromyographic feedback to an absolute minimum or to maintain silence in the earphones.

With the above described apparatus, the electromyogram signal reproduced in the earphones sound like low frequency static, having a modal frequency of approximately 80 to 90 cycles per second due to the integration of the signal over a one-fifth second time constant thus eliminating the extremely high frequency notes.

If the subject begins to adapt to a given level of noise, the observer can increase the gain in the feedback loop thereby forcing the subject to pay closer attention to the control of the static generated by subvocalization.

A pilot study was made on a class of 35 subjects of whom 7 were found to subvocalize. These 7 were treated by the feedback of the electromyographic signal and in the majority of cases, one session of feedback treatment was sufficient to result in the complete cessation of subvocalization. Repeated tests over several months time indicated no change from the effectiveness of the initial feedback session once control of subvocalization had been learned by the subject.

The complete extinction of a habit which probably had existed during the entire time the subject had been reading was not expected to occur so quickly and so easily. One hypothesis has been formulated to explain this phenomena. The introspective reports on the subjects who underwent this treatment indicated that one of the problems they faced in learning to control the feedback of the signal produced by subvocalization was in learning to breathe normally without becoming tense because of their concern over their subvocal activity. Once they were able to breathe in a normal fashion the control of the feedback became much easier. This suggests that the breathing rate present in subjects who subvocalize may be identical to that present during audible speech. In other words the subject exhibits exactly the breathing pattern that he would if he were reading aloud at normal conversational or speech level. Disruption of the subvocalization pattern, therefore, may disrupt this irregular breathing pattern and replace it by a normal and regular breathing pattern.

Naturally, other devices and methods can be utilized for the detection of subvocalization activity, the production of the signal that varies in accordance with the amount of such activity and the playing of the produced signal for demonstration of the amount of vocal muscle activity. For example, mechanical or optical detection techniques or a combination of mechanical, optical and electrical techniques can be utilized for detection of vocal muscle activity. While the invention has been described for playback utilizing a signal that varies in amplitude in accordance with the variation of vocal muscle activity, the signal could also or alternatively vary in frequency.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. The method of correcting subvocalization of a subject while the subject is reading comprising the steps of: detecting vocal muscle activity of the subject while the subject is reading; producing a signal from the detected vocal muscle activity with the signal varying in accordance with the amount of vocal muscle activity; directing the signal to the subject whereby the subject can control the signal by controlling the amount of vocal muscle activity.

2. The method of correcting subvocalization of a subject while the subject is reading comprising the steps of: detecting vocal muscle activity of the subject while the subject is reading; producing a signal from the detected vocal muscle activity with the signal varying in variable accordance with the amount of vocal muscle activity; producing a sound from said signal with the sound varying in accordance with the vocal muscle activity; and playing the sound to the subject while the subject is reading whereby the subject can train himself to eliminate subvocalization by controlling his behavior to maintain the sound played to him in a condition representative of behavior without subvocalization.

3. The method in accordance with claim 2 including the step of directing the signal to an observer for observation of the subject during reading for detection of signals due to subvocalization and signals due to other behavior.

References Cited
UNITED STATES PATENTS

| 2,466,054 | 4/1949 | Siebel | 128—1 |
| 2,647,508 | 8/1953 | Pelavin | 128—2.06 |
| 3,026,449 | 3/1962 | Rappaport | 179—1 XR |
| 3,032,029 | 5/1962 | Cunningham | 128—1 |
| 3,151,619 | 10/1964 | Sullivan | 128—418 XR |
| 3,229,687 | 1/1966 | Holter et al. | 128—2.06 |
| 3,245,403 | 4/1966 | Lieberman | 128—2 |
| 3,345,979 | 10/1967 | Miura et al. | 128—2 |

RICHARD A. GAUDET, *Primary Examiner.*

W. E. KAMM, *Assistant Examiner.*